Sept. 25, 1951 S. E. LIDIN 2,569,109
PIVOT FOR HORIZONTALLY SWINGING WINDOWS
Filed June 15, 1945 2 Sheets-Sheet 1
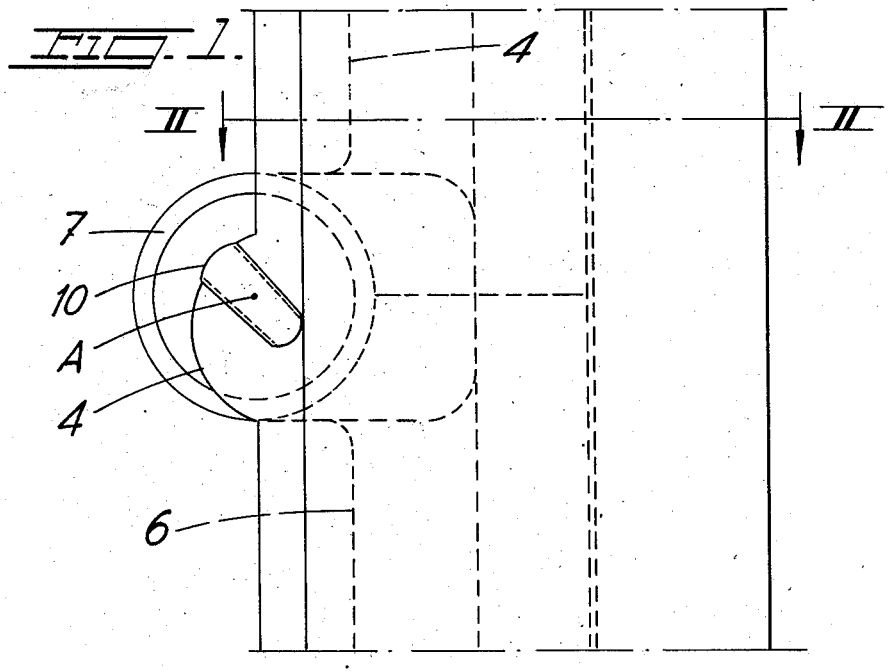
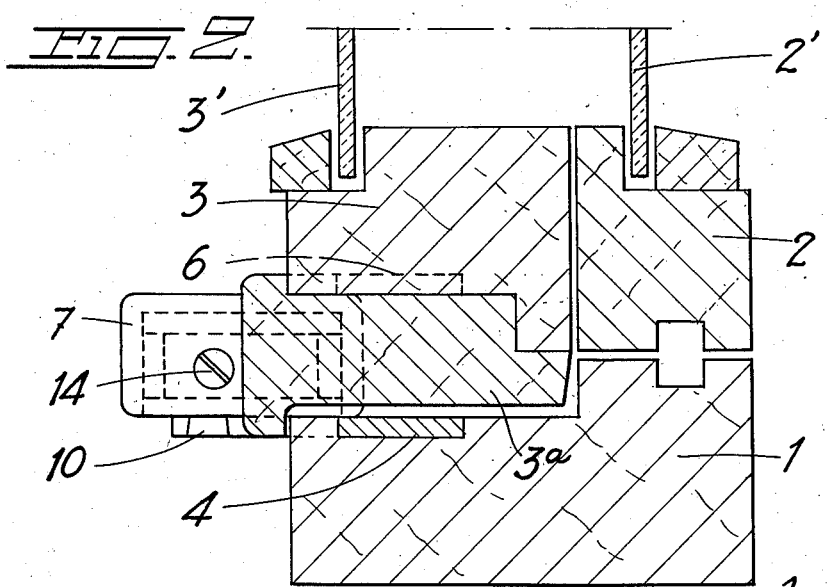

Sept. 25, 1951 S. E. LIDIN 2,569,109
PIVOT FOR HORIZONTALLY SWINGING WINDOWS
Filed June 15, 1945 2 Sheets-Sheet 2
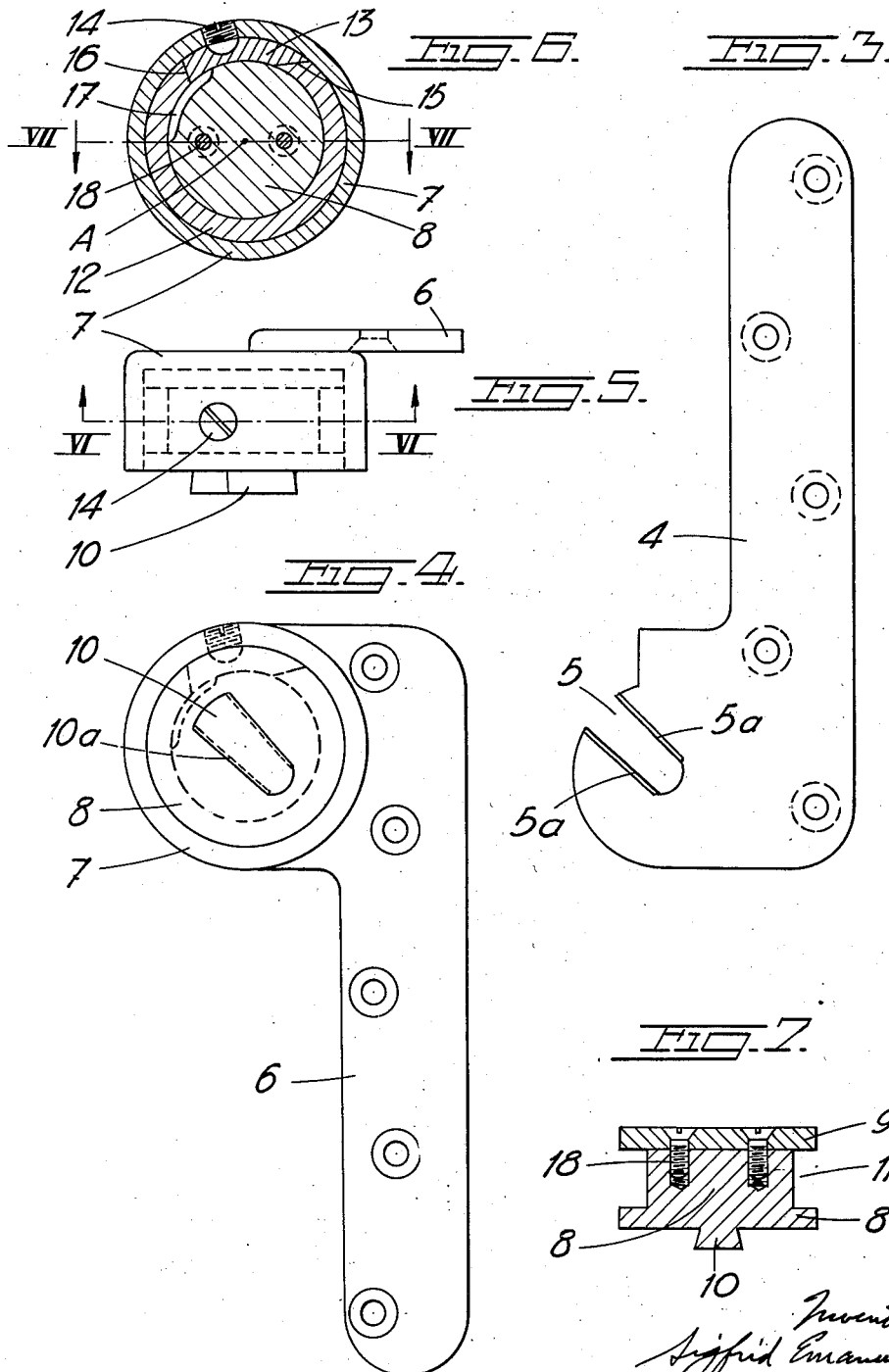

Patented Sept. 25, 1951

2,569,109

UNITED STATES PATENT OFFICE 2,569,109

PIVOT FOR HORIZONTALLY SWINGING WINDOWS

Sigfrid Emanuel Lidin, Stockholm, Sweden, assignor to Aktiebolaget Atvidabergs Industrier, Atvidaberg, Sweden, a corporation of Sweden Application June 15, 1945, Serial No. 599,620
In Sweden March 31, 1944

Section 1, Public Law 690, August 8, 1946
Patent expires March 31, 1964

3 Claims. (Cl. 16—140)

This invention relates to windows of the type in which at least one pane-carrying sash is pivoted in a stationary frame on horizontal pivots.

The provision of braking mechanisms for the bearings of such windows is important for ease of manipulation of the window, but hitherto such combined braking and bearing devices were of a rather complicated and expensive construction.

The present invention has for its object to produce a simple and inexpensive bearing and braking device for such windows, whereby the braking action is attained in a simple and reliable manner avoiding complicated constructions.

A preferred embodiment of the invention is by way of example illustrated in the annexed drawing. In this embodiment the invention is shown as applied to double windows, that is windows with double interconnected sashes carrying double parallel glass panes.

Fig. 1 is a side elevation of a portion of the stationary frame together with the bearing and braking device according to the invention.

Fig. 2 is a horizontal cross section through one vertical side of the frame and the sashes on the line II—II in Fig. 1.

Fig. 3 is a side elevation of a holding fitting adapted to be mounted on the stationary frame.

Fig. 4 is a side elevation of the bearing and braking device adapted to be mounted on the inner sash.

Fig. 5 shows the bearing and braking device from the upper end in Fig. 4.

Fig. 6 is a vertical cross section on the line VI—VI in Fig. 5.

Fig. 7 is a horizontal section of part of the structure shown in Fig. 6, taken on the line VII—VII of Fig. 6.

Referring now to the drawings, the reference numeral 1 indicates the stationary frame, 2 represents the outer sash. The inner sash is composed of two suitably profiled members 3 and 3a rigidly interconnected. The glass panes are indicated by 2' and 3'. The two sashes are coupled together in any well-known manner (not illustrated). Although only one vertical side of the stationary frame and sashes is shown it is evident that the arrangement at the other vertical side is made correspondingly.

A holding fitting 4 is securely mounted on the stationary frame 1 and an inclined slot 5 is provided in an extension on said fitting, which extension projects inwardly to the room. This slot is wedge-shaped or bevelled in two perpendicular planes. Thus, the slot tapers from its outer open end, inwardly towards the fitting and the two lateral edges are bevelled, as shown at 5a.

Another fitting 6 is securely mounted in the inner sash 3, 3a. This fitting carries a cylindrical casing 7 which is integral with or rigidly connected with the fitting 6, for instance by means of welding. In this cylindrical casing a cylindrical body or journal 8 is rotatably mounted. The journal 8 has a radial flange 8a at one end and a cylindrical disc 9 attached to the other end surface by means of screws 18, so that the combined rigid body 8, 9 has a shape similar to that of a reel. On the body 8 a projection 10 is provided which is shaped to fit in said slot 5. For this purpose the projection is wedge-shaped in two perpendicular planes. Thus, the two longitudinal or lateral edges of the projection converge in one direction and the projection is bevelled on these longitudinal edges, as shown at 10a, so that the longitudinal lateral surfaces are undercut, that is grooved under the edges.

In the circumferential cylindrical track 11 of the combined body 8, 9 a circularly bent plate spring 12 and a brake shoe 13 shaped in correspondence with the form of the track 11, are provided. The plate spring is bent on a smaller radius than the bottom surface of the track 11. Thus, the plate spring when mounted upon the journal 8, tends to contract and thereby exerts a pressure on the bottom surface of the track 11. In the casing or bushing 7 a headless screw 14 is inserted, which screw projects into an aperture or recess in the brake shoe 13 and serves the purpose of holding the brake shoe against the body 8 with a pressure adjustable by the setting of the screw 14. This screw also serves the purpose of preventing the journal 8 from leaving the casing 7 in axial direction. The surfaces 15 of contact between the brake shoe 13 and the spring 12 at one end of the brake shoe form a substantial angle with the radius from the centre A, the end surface of the brake shoe being chamfered in the direction such that its outer edge extends circumferentially beyond its inner edge, whereas the surfaces 16 of contact between the brake shoe 13 and the spring 12 at the other end form a smaller angle with the radius from the centre A, this end of the brake shoe being chamfered so that its inner edge extends circumferentially beyond its outer edge. In other words, the inclination of the boundary surface 15 towards the bottom of the track 11 is not so steep as the inclination of the boundary surface 16.

The bearing and braking device as described operates in the following manner:

When the window is in its closed position the details of the device are in the positions of rest, as shown in the drawing. Now, if the window is opened by a swinging motion around the horizontal axis A of rotation, the brake shoe 13, to begin with, slides upon the higher part of the bottom of the track 11. When the window is opened or closed, the stationary fitting 4 holds the combined body 8, 9 against rotation, whereas the fitting 6, the casing 7, and the brake shoe 13 as well as the spring 12 are turned. During the opening of the window this turning motion occurs in a counter-clockwise direction in Fig. 6, whereas during the closing of the window said motion occurs in the clockwise direction in Fig. 6. During the turning motion in the counter-clockwise direction the brake shoe 13 soon passes downwardly into the recess 17. Thereby the braking action is substantially suspended or eliminated until the brake shoe again slides up onto the higher part of the bottom of the track 11 at the opposite end of the recess 17. Thus, even after a small angle of rotation the opening of the window is effected substantially without braking. This causes the pivoted sashes under the action of their own weight to occupy a definite angle of inclination, determined by the recess 17. From an esthetic point of view all of the windows on a house facade should automatically be set in the same angular position when opened. This angular position is selected in such manner that the appropriate airing is obtained.

On account of the angle of inclination of the contact surface 15 it is very easy to open the window, the spring 12 by means of the inclined surface 15 lifting the brake shoe from the bottom of the track 11 during the turning motion in counter-clockwise direction in Fig. 6. On the contrary, when closing the window an increased braking action is obtained, the spring 12 by means of the inclined surface 16 holding the brake shoe in contact with the bottom of the track 11. This is important because the window on account of the location of the center of gravity has the tendency to fall back into closed position from slightly opened position and, thus, a more efficient braking action is desirable for the closing of the window than for the opening of the same.

Moreover, the two interconnected sashes, that is, the outer sash 2 and the inner sash 3, 3a evidently can be lifted directly out from the stationary frame 1 without unfastening of screws or the like, the braking device 6—18 then still being carried by the sash. Because the projection 10 as well as the slot have a double wedge shape, that is, are bevelled or tapering in two different planes, the projection 10 will be exactly fixed and centered in all directions in the slot 5 of the stationary fitting 4. Thus, the frame and the sashes are held together and the seam between the frame and the sashes will become constant round the whole perimeter of the window. The particular shape of the projection 10 and the slot 5 also facilitates the mounting of the interconnected sashes into the frame.

It should be observed that the screw 14 for adjusting the braking action, is arranged also to hold axially the journal and other loose details of the bearing. Thus, the mounting and detaching of the device can be performed in a very simple way.

What I claim is:

1. A pivot bearing for a window sash adapted to swing about a horizontal axis in a stationary window frame, comprising, in combination, a first fitting adapted to be secured to the stationary window frame and having an open, bevelled slot, a second fitting adapted to be secured to the swingable window sash, a cylindrical casing on said second fitting, a pivot member rotatably journalled in said casing and having a circumferential circular groove, a projection on said member, said projection being bevelled to fit in the slot in said first fitting, a brake shoe in the groove in said pivot member and having a recess, a screw in said casing entering the recess in said brake shoe, and a circularly bent plate spring in the groove in said member, the ends of said spring engaging the ends of said brake shoe so that said brake shoe and said spring together form a ring.

2. A pivot bearing for a window sash adapted to swing about a horizontal axis in a stationary window frame, comprising, in combination, a first fitting adapted to be secured to the stationary window frame and having an upwardly extending open oblique slot bevelled in two perpendicular planes, a second fitting adapted to be secured to the swingable sash, a cylindrical casing on said second fitting, a pivot member rotatably journalled in said casing, and having circumferential flanges forming a circular, circumferential groove between them, a projection on said member, said projection being bevelled in two perpendicular planes to fit in the slot in said first fitting, a brake shoe in the shape of a segment of a ring in the groove between said flanges, said brake shoe having a recess, a screw through said casing for entering the recess in said brake shoe, and a plate spring in the shape of a segment of a ring in the groove between said flanges, the ends of said spring engaging the ends of said brake shoe to form together with said brake shoe a ring, said member having along a part of its periphery between said flanges a recess, into which said brake shoe is able to enter in certain positions of rotation relative to said member.

3. A pivot bearing for a window sash adapted to swing about a horizontal axis in a stationary window frame, comprising, in combination, a first fitting adapted to be secured to the stationary window frame and having an upwardly extending open oblique slot bevelled in two perpendicular planes, a second fitting adapted to be secured to the swingable sash, a cylindrical casing on said second fitting, a pivot member rotatably journalled in said casing and provided with circumferential flanges forming a circular, circumferential groove between them, a projection on said member, said projection being bevelled in two perpendicular planes to fit in the slot in said first fitting, a brake shoe in the shape of a segment of a ring in the groove between said flanges, said brake shoe having a recess, a screw through said casing for entering the recess in said brake shoe, and a plate spring in the shape of a segment of a ring in the groove between said flanges, the ends of said spring engaging the ends of said brake shoe to form together with said brake shoe a ring, the end surfaces of said brake shoe being oblique, the outer edge of one end surface extending circumferentially beyond the inner edge thereof, and the inner edge the other end surface extending circumferentially beyond the outer edge thereof.

SIGFRID EMANUEL LIDIN.

REFERENCES CITED

The following references are of record in the file of this patent:

UNITED STATES PATENTS

| Number | Name | Date |
|---|---|---|
| 246,410 | Morgan | Aug. 30, 1881 |
| 1,733,514 | Phinney | Sept. 27, 1927 |

FOREIGN PATENTS

| Number | Country | Date |
|---|---|---|
| 5,781 | Great Britain | of 1882 |
| 320,376 | Great Britain | Oct. 7, 1929 |
| 334,982 | Great Britain | Sept. 18, 1930 |